3,830,835
LEUCAURAMINE DERIVATIVES

Violet Boyd, Ronald Arthur Evans, Kenneth Anthony Holt, and Andrew Hunter Morris Renfrew, Blackley, Manchester, England, assignors to Imperial Chemical Industries Limited, London, England
No Drawing. Filed Sept. 1, 1971, Ser. No. 177,110
Claims priority, application Great Britain, Sept. 4, 1970, 42,533; Dec. 16, 1970, 59,715; June 17, 1971, 28,464
Int. Cl. C07c *143/56*
U.S. Cl. 260—510    2 Claims

ABSTRACT OF THE DISCLOSURE

A leucauramine derivative of the general formula:

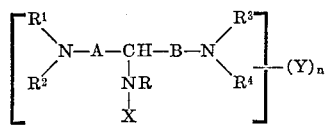

wherein A and B each independently represents an optionally substituted 1,4-arylene residue; R represents hydrogen, hydroxyl, alkoxy or an optionally substituted amino, alkyl, aralkyl or cycloalkyl radical; X represents hydrogen or an optionally substituted hydrocarbon radical which may contain one or more hetero atoms, or R and X together with the attached nitrogen atom form an optionally substituted heterocyclic ring; each of $R^1$, $R^2$, $R^3$ and $R^4$ independently represents hydrogen or an optionally substituted alkyl, aralkyl, cycloalkyl or aryl radical or forms part of a divalent organic chain which together with the attached nitrogen atom constitutes a heterocyclic ring; Y represents a sulpho, sulphino, sulphato, sulphito, thiosulphato, thiosulphono, thiosulphino or thiocarboxy radical, a radical of the formula —D—E wherein D represents oxygen, sulphur or a direct link and E represents a radical of the formula:

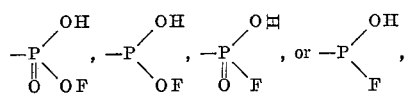

in which F represents hydrogen or a hydrocarbon radical, or a corresponding radical in which one or more of the oxygen atoms may be replaced by sulphur or, provided that Y is attached to a carbon atom forming part of an aromatic carbocyclic or heterocyclic system, Y may represent a hydroxy or mercapto radical, and $n$ has a value of 1, 2 or 3. The compounds may be used as colour formers in hectographic copying processes.

---

This invention relates to leucauramine derivatives of value in impact-printing systems using colourless carbon paper, spirit duplicating carbons and the like.

According to the invention there are provided leucauramine derivatives of the general formula:

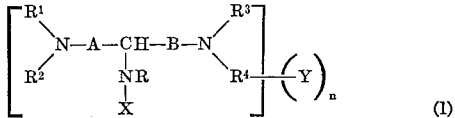

wherein A and B each independently represents an optionally substituted, 1,4-arylene residue; R represents hydrogen, hydroxyl, alkoxy or an optionally substituted amino, alkyl, aralkyl or cycloalkyl radical; X represents hydrogen or an optionally substituted hydrocarbon radical which may contain one or more hetero atoms, or R and X together with the attached nitrogen atom form an optionally substituted heterocyclic ring; each of $R^1$, $R^2$, $R^3$ and $R^4$ independently represents hydorgen or an optionally substituted alkyl, aralkyl, cycloalkyl or aryl radical or forms part of a divalent organic chain which together with the attached nitrogen atom constitutes a heterocyclic ring; Y represents a sulpho, sulphino, sulphato, sulphito, thiosulphato, thiosulphono, thiosulphino or thiocarboxy radical, a radical of the formula —D—E wherein D represents oxygen, sulphur or a direct link and E represents a radical of the formula

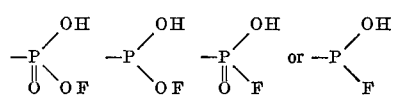

in which F represents hydrogen or a hydrocarbon radical, or a corresponding radical in which one or more of the oxygen atoms may be replaced by sulphur or, provided that Y is attached to a carbon atom forming part of an aromatic carbocyclic or heterocyclic system, Y may represent a hydroxy or mercapto radical, and $n$ has a value of 1, 2 or 3.

Each of the substituents represented by Y may be attached to residue A or B or to any of the radicals represented by X, R, $R^1$, $R^2$, $R^3$ and $R^4$ but is preferably attached to an optionally substituted hydrocarbon radical represented by X. When more than one Y substituent is present in the leucauramine derivative, the said substituents may be the same or different. For example, in a compound containing two Y substituents, these may both be sulpho radicals or one may be a sulpho radical and the other a hydroxy radical. Preferably, each Y is sulpho but extremely useful leucauramine derivatives are provided when Y is sulphato or hydroxy.

Examples of 1,4-arylene residues which may be represented by A and B include particularly 1,4-phenylene but also 1,4-naphthylene residues. As examples of substituents which may be present on said arylene residues there may be mentioned halogen atoms and optionally substituted alkyl or alkoxy groups. It is preferred that no substituents are present on A and B but when substituents are present they are preferably alkyl radicals.

Hydrocarbon radicals which may be represented by X include aryl, for example phenyl and naphthyl, alkyl, for example methyl and ethyl, and various alkyl aryl combinations for example benzyl. Hydrocarbon radicals containing hetero atoms include pyridyl and quinolyl. X is preferably aryl.

As examples of optionally substituted alkyl radicals which may be represented by R, $R^1$, $R^2$, $R^3$ and $R^4$ there may be mentioned optionally substituted lower alkyl radicals, for example ethyl, propyl, butyl, β-hydroxyethyl, β-chloroethyl, β-pyridin-1-ylethyl and, particularly, methyl.

As examples of optionally substituted aralkyl radicals which may be presented by R, $R^1$, $R^2$, $R^3$ and $R^4$ there may be mentioned 4-methoxybenzyl, 2-methylbenzyl and, particularly, benzyl.

As examples of optionally substituted cycloalkyl radicals which may be represented by R, $R^1$, $R^2$, $R^3$ and $R^4$ there may be mentioned 2-methylcyclohexyl, 4-methylcyclohexyl, cyclopentyl and, particularly, cyclohexyl.

As examples of optional substituted aryl radicals which may be represented by $R^1$, $R^2$, $R^3$ and $R^4$ there may be mentioned 2-methylphenyl, 4-methylphenyl, 3-chlorophenyl, naphth-2-yl and, particularly, phenyl.

As examples of optionally substituted amino groups which may be represented by R there may be mentioned dialkylamino groups such as dimethylamino and diethylamino and as examples of alkoxy groups there may be mentioned methoxy and ethoxy.

When either of $R^1$ and $R^2$ forms part of a divalent organic chain which together with the attached nitrogen atom constitutes a heterocyclic ring, this may be because $R^1$ and $R^2$ are joined together or because at least one of $R^1$ and $R^2$ is attached to arylene residue A. The radicals $R^3$ and $R^4$ may in the same way form parts of heterocyclic rings.

As examples of heterocyclic rings which may be formed by $R^1$ and $R^2$ or $R^3$ and $R^4$ being joined together there may be mentioned 5- or 6-membered rings such as piperidine, N-methylpiperazine and morpholine rings. As examples of heterocyclic rings which may be formed by $R^1$ and/or $R^2$ being attached to arylene residue A, or by $R^3$ and/or $R^4$ being attached to arylene residue B, there may be mentioned julolidin-8-yl, N-methyltetrahydroquinolin-6-yl and 1,2-dimethylindolin-5-yl.

Preferably, R is a hydrogen atom or alkyl radical or, together with X and the nitrogen atom forms a heterocyclic ring. As examples of heterocyclic rings which may be represented by R and X together with the nitrogen atom there may be mentioned 5- or 6-membered rings such as pyrrolidine, piperidine and morpholine.

Preferably $R^1$, $R^2$, $R^3$ and $R^4$ are optionally substituted alkyl radicals, particularly unsubstituted alkyl radicals such as methyl or ethyl, or $R^1$ and $R^2$ together and $R^3$ and $R^4$ together form divalent organic chains, preferably hydrocarbon chains.

It is preferred that $n$ has a value of 1.

The leucauramine derivatives of the invention are particularly suitable for use in the preparation of clean-to-handle carbon papers for spirit-reproducing copying processes when used in the form of their Group IA metal, Group IIA metal, optionally substituted ammonium, optionally substituted hydrazine, optionally substituted hydroxylamine, optionally substituted guanidine or heterocyclic base salts. In the salts, the amount of the aforesaid metals and nitrogenous bases is equivalent to at least one of the Y substituents. Particularly useful Group IA metals include sodium, potassium and lithium. Particularly useful Group IIA metals are magnesium and calcium. The substituted ammonium salts may be primary, secondary or tertiary amine salts or quaternary ammonium salts.

In general, the preferred salts are the alkali metal, optionally substituted ammonium, optionally substituted hydrazine, optionally substituted hydroxylamine, optionally substituted guanidine or heterocyclic base salts and, of these, the alkali metal and optionally substituted ammonium salts are favoured, especially the substituted ammonium salts.

Within the class of leucauramine derivatives represented by Formula I, particular mention may be made of the alkali metal, alkaline earth metal, ammonium, substituted ammonium, optionally substituted hydrazine, optionally substituted hydroxylamine, optionally substituted guanidine or heterocyclic base salts in which R is hydrogen, hydroxyl, an optionally substituted amino, alkyl, aralkyl or cycloalkyl radical or an alkylene chain which together with the attached nitrogen atom and X form a heterocyclic ring; X is an optionally substituted hydrocarbon radical which may contain one or more hetero atoms; each of $R^1$, $R^2$, $R^3$ and $R^4$ independently is an optionally substituted alkyl, aralkyl, cycloalkyl or aryl radical or forms part of a hydrocarbon chain which together with the attached nitrogen atom constitutes a heterocyclic ring and Y each of which is attached to X, is a sulpho, sulphino, phosphono or thiocarboxy radical or, provided X is aromatic, Y may be a hydroxy radical.

Mention may also be made of the alkali metal, ammonium and substituted ammonium salts of leucauramine derivatives of Formula I wherein each of A and B is a 1,4-phenylene residue optionally substituted by one or more alkyl groups, R is hydrogen or alkyl, X is a divalent organic radical, Y, which is attached to X, is sulpho, each of $R^1$, $R^2$, $R^3$ and $R^4$, which may be the same or different, is an alkyl group and $n$ is 1.

The leucauramine derivatives of Formula I may be prepared by reacting a compound having the general formula:

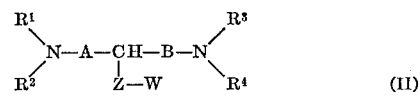

(II)

wherein A, B, $R^1$, $R^2$, $R^3$ and R4 have the meanings already stated, Z represents sulphur or, preferably, oxygen and W represents alkyl or, preferably, hydrogen with an amine of the formula:

$$X—NHR \qquad (III)$$

wherein X and R have the meanings already stated, the compound and the amine together containing $n$ radicals of the formula Y, wherein $n$ and Y have the meanings already stated.

The leucauramine derivatives so prepared may be converted into their Group IA metal, Group IIA metal, optionally substituted ammonium, optionally substituted hydrazine, optionally substituted hydroxylamine, optionally substituted guanidine or heterocyclic base salts, if desired, by treatment with the appropriate agent, for example a Group IA metal hydroxide, alkoxide, carbonate or bicarbonate, a Group IIA hydroxide or an appropriate nitrogenous base. Alternatively, the salts may be prepared directly by starting from a compound of Formula II and/or an amine of Formula III already in salt form.

Examples of compounds of Formula III include metanilic acid,
sulphanilic acid,
orthanilic acid,
o-aminophenol-p-sulphonic acid,
1-amino-8-hydroxynaphthalene-2,4-disulphonic acid,
1-amino-8-hydroxynaphthalene-3,6-disulphonic acid,
m-aminophenol,
o-aminophenol,
p-aminophenol,
2-naphthylamine-7-sulphonic acid,
methyl aniline-ω-sulphonic acid,
1-naphthylamine-3,8-disulphonic acid,
2-naphthylamine-3,6-disulphonic acid,
2-naphthylamine-4,8-disulphonic acid,
1-naphthylamine-4,8-disulphonic acid,
2-naphthylamine-6,8-disulphonic acid,
1-naphthylamine-4-sulphonic acid,
1-naphthylamine-6-sulphonic acid,
1-naphthylamine-7-sulphonic acid,
1-naphthylamine-5-sulphonic acid,
1-naphthylamine-8-sulphonic acid,
2-naphthylamine-1-sulphonic acid,
2-naphthylamine-6-sulphonic acid,
1-naphthylamine-3,6,8-trisulphonic acid,
1-naphthylamine-4,6,8-trisulphonic acid,
2-naphthylamine-3,6,8-trisulphonic acid,
2-aminotoluene-4-sulphonic acid,
4-aminotoluene-2-sulphonic acid,
2-aminoethane sulphonic acid,
1-amino-4-thiobenzoic acid,
1-amino-3-thiobenzoic acid,
1-amino-2-thiobenzoic acid,
1-aminobenzene-4-sulphinic acid,
1-amino-benzene-3-sulphinic acid,
1-aminobenzene-2-sulphinic acid,
p-aminophenylsulphuric acid,
m-aminophenylsulphuric acid,
p-aminothiophenol,
p-aminophenylphosphonic acid,
m-aminophenylphosphonous acid,
p-aminonaphthylphosphoric acid
and their salts.

Examples of compounds of Formula II include Michler's Hydrol, bis(4-diethylaminophenyl)methanol,
bis(2-methoxy-4-dimethylaminophenyl)methanol,
bis(4-piperidinophenyl)methanol,
bis(2-methyl-4-dimethylaminophenyl)methanol,
bis(N-methyl-6-tetrahydroquinolinyl)methanol,
bis(4-methylsodium-β-ethyl sulphato aminophenyl) methanol and
bis(2-sodium sulphato-4-dimethylaminophenyl)methanol.

The process of making the leucauramine derivatives is conveniently carried out in a solvent such as water, alcohols or toluene. Suitable temperatures for the process are from 0° C. to 150° C., preferably from 20° C. to 100° C.

Leucauramine compounds of Formula I may also be prepared by reducing a compound of the formula:

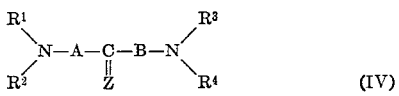

wherein A, B, $R^1$, $R^2$, $R^3$, $R^4$ and Z have the meanings already stated, using neutral or alkaline conditions and reacting the product, without isolation, with an amine of Formula III, the compound and the amine together containing $n$ radicals of the formula Y wherein $n$ and Y have the meanings already stated.

Suitable compounds of Formula IV include Michler's Ketone and derivatives thereof.

Leucauramine compounds of Formula I in which R is hydrogen may also be prepared by reducing an auramine derivative of the formula:

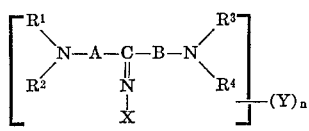

wherein A, B, $R^1$, $R^2$, $R^3$, $R^4$, X, Y and $n$ have the meanings already stated, using neutral or alkaline conditions.

The leucauramine derivatives of Formula I singly or as mixtures and preferably in the form of their aforesaid salts are particularly suitable for use in the production of carbon papers of the clean-to-handle type.

Carbon papers of the clean-to-handle type for use in the so-called hectographic or spirit-reproducing copying process consisting of tissue or other suitable film or sheet material on which is a coating containing a colourless derivative of a basic dyestuff such as Crystal Violet Lactone have already been proposed. In the copying process the carbon paper is placed with its coated surface against one surface of a master paper which is then typed, written or marked on causing transfer of the coating as a substantially colourless reverse image to the first-mentioned surface of the master paper at the points where carbon and master papers have been pressed together. The master paper is then brought into contact with a succession of sheets of paper moistened with a suitable spirit-reproducing fluid such as ethanol. The fluid dissolves a part of the basic dyestuff derivative and transfers it to each paper sheet where it combines with an activating substance such as an acid to give a visible colour which will reproduce the original typing or writing on the master paper.

Basic dyestuff derivatives hitherto proposed in this process have the disadvantage that they tend to give sticky coatings which are not easy to apply satisfactorily to the the tissue or other film or sheet material and may give rise to unclear copies or copies having poor fastness to light. These disadvantages are descreased by the use of the leucauramine compounds of the present invention. The said compounds may be included in coating compositions which may be applied by conventional means to a support material to produce the said clean-to-handle carbon papers.

The invention is illustrated but not limited by the following Examples in which all parts and percentages are by weight.

Example 1

27 Parts of Michler's Hydrol, 100 parts of ethanol and 17.3 parts of sulphanilic acid are allowed to stand for 2 hours and then refluxed with stirring for a further 4 hours. The solution is chilled in ice and the solid is filtered off to give the free acid, 12.5 parts. This sulphonic acid is added with stirring to a solution of sodium methoxide prepared from 0.68 part of sodium and 30 parts of methanol. The solution is then chilled in ice and the bis-(p-dimethylaminophenyl)methane - α - anilino - p - sodium sulphonate isolated by filtration. Other alkali metal alkoxides, hydroxides, carbonates, bicarbonates, ammonium hydroxide and organic bases can be used for salt formation.

35 Parts of bis(p-dimethylaminophenyl)methane-α-anilino-p-sodium sulphonate are added to and mixed with a conventional hectocarbon "dope" comprising 30 parts of fatty grey carnauba wax, 35 parts of vaseline and 35 parts of medium viscosity mineral oil at 85° C. The mixture is then passed over a heated triple-roll mill until the dispersion gives a reading of 6 on a Hegman gauge.

A tissue is given a barrier coating of a polyvinyl alcohol/ethyl cellulose composition in order to mask the acidity of the tissue which would otherwise cause some development of colour when the leucauramine coating is applied.

The coating is applied to the barrier-coated tissue to give a coating weight of 24.0 g. per sq. m.

If the coating so obtained remains "sticky" it may be necessary to add a small percentage of white pigment such as rutile titanium dioxide or extender such as whiting to the coating composition. This has the effect of taking up any excess "oil" that may be present and a smooth coating which reaches optimum hardness in 3 days is obtained.

Copies are effected by making a reverse imprint on master paper.

The master paper is used in a spirit duplicating machine to give images of the typescript on a succession of sheets of copy paper. The copy paper is impregnated with a copying fluid which is a mixture of 86 parts of 94% ethanol, 10 parts of benzyl alcohol and 4 parts of salicylic acid. The colour obtained develops slowly over a period of about 2 minutes; initially a purple colouration is obtained which eventually turns blue. Over 50 copies of good intensity are produced.

Example 2

27 Parts of Michler's Hydrol, 100 parts of ethanol and 21.3 parts of α - naphthylamine - 4 - sulphonic acid are heated under reflux for 4 hours. The solution is chilled in ice and the solid filtered off and dried to give the free acid, 20 parts. The free acid is then added with stirring to a solution of sodium methoxide prepared from 1 part of sodium and 30 parts of methanol and the solid which results filtered off and dried to give the product. Other alkali metal alkoxides, hydroxides, carbonates, bicarbonates, ammonium hydroxide and organic bases can be used for salt formation.

A coating is prepared by mixing 5 parts of the product prepared as described above, 2 parts of first pressings Castor Oil and 0.5 part N 10. Ethyl Cellulose (Hercules Pdr. Co.) along with 17 parts to toluene in a "red devil" mill with 3 mm. Ballatini Beads for 15 minutes. The dispersion is then coated on to "Melinex" polyester film to give a coating weight of 20.0 g.s.m. The flow of the coating is good. The coated film is used to give a reverse imprint on master paper, complete transfer of the coating is obtained.

Copying is effected with conventional copying fluid impregnating suitable acid coated copying paper in a spirit duplicating machine. The acid coating may be a so-called acid mineral such as attapulgite, Kaolin etc. or an acid treated coating such as that obtained with coating compositions containing acids such as tannic, oleic, gallic, PTMA acids possibly in conjunction with precipitated calcium carbonate or blanc fixe on the paper.

The colour obtained develops over a period of 3–4 minutes to give over 50 good copies.

Example 3

27 Parts of Michler's Hydrol, 100 parts of acetone and 17.3 parts of metanilic acid are heated, under reflux, for 30 minutes. The suspension is chilled in ice, the solid isolated by filtration and air dried to give 25 parts of m-sulphophenyl-leucauramine. The sodium salt is prepared by dissolving the acid in sodium hydroxide solution and allowing to crystallise. The off-white solid obtained is oven dried to give the product which does not melt below 300° C. Other salts are prepared from the free acid in a similar manner.

When applied to tissue as described in Example 1 the product gives a coating transferable to a master sheet which in turn is used as described in Example 1 to give copies on copy paper.

Example 4

27 Parts of Michler's Hydrol, 100 parts of ethanol and 17.4 parts of 2-aminoethane trimethylamine sulphonate are heated under reflux for 2 hours then all but 40 parts of the solvent removed by distillation. The solution is chilled in ice to give bis-(p-dimethylaminophenyl)methane-$\alpha$-2-aminoethane trimethylamine sulphonate as an impure grey solid m.p. 105°.

The product is used to give a coated film to be used in a spirit duplicating process as described in Example 2.

Example 5

54 Parts of Michler's Hydrol, 39 parts of sodium sulphanilate and 250 parts of ethanol are heated under reflux, with stirring, for 4 hours. The resultant solution is cooled to room temperature and the solid which separates out isolated by filtration. Oven drying gives 55 parts of bis (p-dimethylaminophenyl)methane - $\alpha$ - anilino-p-sodium sulphonate which does not melt below 300° C.

A coating mixture is prepared by mixing 4 parts of the product, 4 parts of medium viscosity mineral oil and 6 parts of methyl ethyl ketone in a red-devil for 15 minutes using 3 mm. Glass Beads to aid dispersion, adding 3 parts of toluene and 0.5 part of a polyvinyl acetate/polyvinyl chloride copolymer, stirring with an electric stirrer for 5 minutes and diluting with 4 parts of methyl-ethyl ketone.

The dispersion is then coated on to "Melinex" polyester film to give a coating weight of 20.0 g.s.m.

Suitable coloured pigments may be added to the coating formulation to give a coating that may easily be identified.

Copies of the coating are obtained as described in Example 2.

Example 6

33 Parts of Michler's Hydrol (65% paste), 22 parts of triethylamine-p-aminophenylsulphonate and 80 parts of ethanol are heated under reflux, with stirring, for 1 hour. The resultant solution is cooled to room temperature overnight to give a crystalline solid which is isolated by filtration. Air drying gives 15 parts of bis-(p-dimethylaminophenyl)methane - $\alpha$ - anilino-6-triethylamine sulphonate m.p. 168° C.

The product is applied to tissue by the method described in Example 1.

Example 7

4.14 Parts of Michler's Hydrol (65% paste), 23 parts of potassium p-aminophenylsulphate and 100 parts of ethanol are heated under reflux, with stirring for 1 hour. The solution is chilled in ice to give a grey solid which is isolated by filtration. Oven drying gives 10 parts of bis-(p-dimethylaminophenyl)methane - $\alpha$ - anilino-p-potassium sulphate m.p. >300° C.

The product is used to give a coated film as described in Example 2.

Example 8

23 Parts of Michler's Hydrol (65% paste), 11.4 parts of calcium metanilate and 75 parts of ethanol are heated under reflux, with stirring for 2 hours. Cooling to room temperature gives a solid which is isolated by filtration, and oven dried. The product, bis-(p-dimethylaminophenyl)methane - $\alpha$ - anilino - m - calcium sulphonate is a pale grey solid m.p. >300° C.

The product is used to give a coated film as described in Example 2.

Example 9

32 Parts of Michler's Ketone, 17.1 parts of potassium hydroxide and 200 parts of ethanol are heated to reflux with stirring and 20 parts of zinc dust are added. After 16 hours the suspension is cooled and the zinc residues are filtered off. Concentrated hydrochloric acid is then added to the filtrates until a pH of 6 is given. 33 Parts of sodium sulphanilate is added and the resultant solution refluxed with stirring for 4 hours. Cooling overnight gives a white solid which is isolated by filtration and oven dried at 100° C. to yield bis-(p-dimethylaminophenyl)-methane-$\alpha$-anilino-p-sodium sulphonate 34 g. m.p. >300° C.

Example 10

To a solution of 12.9 parts of tertiary octylamine in 100 parts of water is added 2N hydrochloric acid until a pH of 10 is achieved. 26 Parts of bis-(p-dimethylaminophenyl)methane - $\alpha$ - anilino-p-sodium sulphonate is added and the suspension stirred vigorously for 10 minutes. The resulting off white solid is isolated by filtration and air dried to give 34 parts of bis-(p-dimethylaminophenyl)methane - $\alpha$ - anilino - p - octylamine sulphonate m.p. 190–192° C.

Example 11

140 Parts of bis - (p - diethylaminophenyl)methanol (70% paste), 937 parts of water and 51.6 parts of hydrochloric acid (35.5%) are stirred at room temperature for 15 minutes. To this solution is added a solution prepared from 162 parts of metanilic acid, 263 parts of water and 90 parts of caustic liquor (37.5%) and the resultant liquid stirred at room temperature for 3 hours. 55 parts of caustic liquor (37.5%) is then added to give a pale blue precipitate. The temperature is raised to 70° C. and the solution filtered through a bed of "Hyflo" and the residue washed with 200 parts of hot water. The combined filtrates are allowed to cool to room temperature and the crystalline mass isolated by filtration. The product is vacuum dried to give 120 parts of bis - (p - diethylaminophenyl)methane - $\alpha$ - anilino-m-sodium sulphonate.

Example 12

8.3 Parts of Michler's Hydrol (65% paste), 28 parts of water and 4.16 parts of hydrochloric acid (35.5%) are stirred at room temperature for 30 minutes. To this solution is added a solution prepared from 9.1 parts of 2-naphthylamine - 5,7-disulphonic acid, 72 parts of water and sufficient caustic liquor (37.5%) to raise the pH to 7 and the resultant reaction mixture stirred for 3 hours. Caustic liquor is then added to render the pH alkaline to Clayton Yellow indicator and a heavy grey precipitate results. 70 parts of water is added to dissolve the precipitate, the solution filtered through "Hyflo" and then 6 parts of salt are added to salt out the product, which is isolated by filtration. Vacuum drying gives 8.9 parts of bis - (p - dimethylaminophenyl)methane - $\alpha$ - 2 - naphthylamine-5,7-disodium sulphonate.

Example 13

8.3 Parts of Michler's Hydrol (65% paste), 28 parts of water and 4.16 parts of hydrochloric acid (35.5%) are stirred at room temperature for 30 minutes. To this solution is added a solution prepared from 9.1 parts of 1-naphthylamine - 3,8 - disulphonic acid, 72 parts of water and sufficient caustic liquor (37.5%) to raise the pH to 7, and the resultant reaction mixture stirred for 3 hours. Caustic liquor is then added to render the pH alkaline to Clayton Yellow indicator. The solution is filtered through a bed of "Hyflo" and then 12 parts of salt are added to salt out the product, which is isolated by filtration. Air drying gives 9.9 parts of bis-(p-dimethylaminophenyl) methane - α - 1 - naphthylamine-3,8-disodium sulphonate.

Example 14

52 Parts of Michler's Hydrol (62% paste), 280 parts of water and 20.5 parts of hydrochloric acid (35.5%) are stirred at room temperature for 15 minutes. To this solution is added a solution of 61 parts of sodium sulphanilate in 200 parts of water and the resultant reaction mixture stirred for 3 hours. 42.8 Parts of caustic liquor (37.5%) is added dropwise at the solution further stirred for 15 minutes then filtered through "Hyflo." To the filtrate is added 60 parts of salt and the precipitated product allowed to stir for 2 hours. The solid is isolated by filtration and over dried at 100° C. to yield 80 parts of sodium-p-sulphophenyl leucauramine.

Example 15

52 Parts of Michler's Hydrol (62% paste), 280 parts of water and 20.5 parts of hydrochloric acid (35.5%) are stirred at room temperature for 15 minutes. To this solution is added a solution prepared from 27 parts of metanilic acid, 30.4 parts of sodium sulphanilate, 200 parts of water and sufficient caustic liquor to adjust the pH to 7 and the resultant reaction mixture stirred for 3 hours. 42.8 parts of caustic liquor are added dropwise to give a tarry solid. Heating to 80° C. dissolves the tar and the solution is rapidly filtered through "Hyflo." The filtrate is allowed to cool and 60 parts of salt are added to give a grey solid which after stirring for 2 hours is isolated by filtration. Air drying gives 70 parts of a mixed product containing sodium meta and para sulphophenyl leucauramines.

Example 16

20.8 Parts of Michler's Hydrol (65% paste), 9.75 parts of sodium sulphanilate and 100 parts of toluene are heated under reflux, with stirring, for 1 hour. After cooling the solution in ice, the solid which separates is filtered off and air dried to give sodium-p-sulphophenyl leucauramine.

Example 17

41.5 Parts of Michler's Hydrol (65% paste), 10.9 parts of p-aminophenol and 100 parts of ethanol are heated under reflux, with stirring, for 1 hour. On cooling, the contents of the flask set solid. The product is removed from the flask and suction dried to give 20 parts of p-hydroxyphenyl leucauramine.

The alkali metal salts of the product are readily made in water.

Example 18

54 Parts of bis-(p-di-β-cyanoethylaminophenyl)methanol (80% paste), 19.5 parts of 4-amino-3-methyl-sodium benzenesulphonate and 250 parts of ethanol are heated under reflux with stirring for 1½ hours. 100 Parts of ethanol are removed by distillation and the resultant solution is chilled in ice overnight. The grey solid which separates is collected and air dried to yield 9 parts of bis-(p - di - β - cyanoethylaminophenyl)methane-α-o-toluidine-p-sodium sulphonate.

Example 19

42 Parts of Michler's Hydrol (65% paste), 21.6 parts of sodium - 3 - amino-4-methylbenzenesulphonate (90% paste) and 250 parts of ethanol are heated under reflux, with stirring, for 1 hour. The solvent is reduced to half bulk by distillation and the product crystallises out on cooling. Filtration yields 7.2 parts of sodium-2-methyl-5-sulphophenyl leucauramine.

Example 20

15 Parts of m-sulphophenyl leucauramine (Example 3), 6 parts of triethylamine and 120 parts of water are stirred for 2 hours to give a grey precipitate. Filtration yields 11.6 parts of the triethylamine salt of m-sulphophenyl leucauramine.

Example 21

44 Parts of sodium-p-sulphophenyl leucauramine (Example 1), 13 parts of morpholine hydrochloride, 0.5 parts of morpholine and 100 parts of water are stirred for 3 hours. The off-white solid which separates is collected and air dried to give 48 parts of the morpholine salt of p-sulphophenyl leucauramine.

Example 22

4.4 Parts of sodium-p-sulphophenyl leucauramine, 2 parts of triethanolamine hydrochloride, 0.2 part of triethanolamine and 10 parts of water are stirred for 5 minutes. The solid which separates is collected by filtration and air dried to yield 2.9 parts of the triethanolamine salt of p-sulphophenyl leucauramine.

Example 23

8.4 Parts of bis-(p-dibenzylaminophenyl)methanol (68% paste), 1.7 parts of orthanilic acid and 50 parts of ethanol are heated under reflux with stirring for 20 minutes. The solution is cooled to give a grey solid which is isolated by filtration and air dried to yield 2 parts of bis - (p - dibenzylaminophenyl)methane-α-anilino-o-sulphonic acid.

Example 24

4.3 Parts of bis-[p-N-methyl-N-4-methylcyclohexyl) amino phenyl]methanol, 1.57 parts of 3-aminobenzene sulphinic acid and 20 parts of acetone are stirred at room temperature for 5 hours then cooled. The grey solid which separates is filtered off and air dried to yield 1.5 parts of bis - [p-(N-methyl-N-4-methylcyclohexyl)aminophenyl] methane-α-anilino-m-sulphinic acid.

Example 25

4.79 Parts of potassium-p-sulphatophenyl leucauramine (Example 7) is dissolved in 400 parts of water and a solution of 3 parts of di-o-tolyl-guanidine hydrochloride in 20 parts of water is added dropwise with stirring. A fine white precipitate results which is collected and oven dried to yield 6.2 parts of the di-o-tolyl-guanidine salt of p-sulphatophenyl leucauramine.

Example 26

13.4 Parts of Michler's Ketone, 5 parts of phosphorus oxychloride and 60 parts of propylene dichloride are heated to 65° C. with stirring for 2 hours, then cooled to room temperature. The blue solid which separates is filtered off and washed with 20 parts of ether.

The blue solid is added rapidly to a solution of 19.5 parts of sodium metanilate in 150 parts of isopropanol, and is stirred at room temperature for 10 minutes. The deep orange solution is poured into an excess of ice cold 4N caustic soda solution with stirring and the white precipitate is collected by filtration. The solid is dissolved in 100 parts of water and 100 parts of ethanol containing 1 part of sodium hydroxide and hydrogenated over palladised charcoal catalyst at room temperature until 1 equivalent of hydrogen has been absorbed. The solvent is reduced to half bulk after removal of the catalyst and the solution chilled in ice to yield 13 parts of sodium-m-sulphophenyl leucauramine.

Each of the leucauramine compounds prepared in Examples 9-26 is used in the preparation of a coating composition which is then coated on to a polyester film as described in Example 2. The coated film is used in a spirit duplicating process as described in that Example.

The following Table gives further Examples of leucauramine compounds which are used in a similar manner to coat film which is then used in a spirit duplicating process. For convenience, the radical X is indicated in the Table with the substituent Y attached thereto except in Examples 58, 66, 67, 75 and 78 where the Y substituents are attached to arylene residues A and B.

| Ex. No. | $R^1$ and $R^3$ | $R^2$ and $R^4$ | A and B | R | X | Cation | Reaction solvent |
|---|---|---|---|---|---|---|---|
| 27 | Methyl | Methyl | 1,4-phenylene | Hydrogen | p-Sulphophenyl | Ammonium | Ethanol. |
| 28 | do | do | do | do | do | Magnesium | Do. |
| 29 | do | do | do | do | do | Calcium | Do. |
| 30 | do | do | do | do | do | Lithium | Do. |
| 31 | do | do | do | do | do | Potassium | Do. |
| 32 | do | do | do | do | do | Barium | Do. |
| 33 | do | do | do | do | do | Methylammonium | Do. |
| 34 | do | do | do | do | do | Dimethylammonium | Do. |
| 35 | do | do | do | do | do | Hexamethylene diammonium | Water. |
| 36 | Hydrogen | do | do | do | do | Sodium | Ethanol. |
| 37 | β-Chloroethyl | do | do | do | m-Sulphophenyl | Free acid | Acetone. |
| 38 | do | do | do | do | do | Sodium | Water. |
| 39 | β-Hydroxyethyl | do | do | do | p-Sulphophenyl | do | Do. |
| 40 | Ethyl | Ethyl | do | do | m-Thiocarboxyphenyl | do | Ethanol. |
| 41 | Methyl | Methyl | do | do | 4,6,8-trisulpho-1-naphthyl | Trisodium | Water. |
| 42 | do | do | do | do | 3,6-disulpho-2-naphthyl | Disodium | Do. |
| 43 | do | do | do | do | 2-hydroxy-5-sulphophenyl | do | Do. |
| 44 | do | do | do | do | m-Hydroxyphenyl | Sodium | Toluene. |
| 45 | do | do | do | do | o-Hydroxyphenyl | Potassium | Do. |
| 46 | β-Pyridin-1-ylethyl | do | do | do | m-Sulphophenyl | Sodium | Water. |
| 47 | Methyl | do | do | do | 4-sulpho-1-naphthyl | Triethylammonium | Ethanol. |
| 48 | do | do | do | do | m-Sulphatophenyl | Sodium | Do. |
| 49 | Cyclohexyl | do | do | do | 2-methoxy-4-sulphophenyl | do | Do. |
| 50 | 4-methylphenyl | do | do | do | o-Sulphophenyl | Sodium | Do. |
| 51 | Methyl | do | do | do | p-Phosphatophenyl | Disodium | Do. |
| 52 | do | do | do | do | m-Phosphonophenyl | Monosodium | Do. |
| 53 | do | do | do | do | p-Phosphonophenyl | Monopotassium | Do. |
| 54 | do | do | do | do | 8-hydroxy-2,4-sulpho-1-naphthyl | Trisodium | Water. |
| 55 | do | do | do | do | 7-sulpho-2-naphthyl | Sodium | Do. |
| 56 | 4-methoxy benzyl | do | do | do | p-Hydroxyphenyl | Potassium | Ethanol. |
| 57 | | | Julolidin-8-ylene | do | p-Sulphophenyl | Sodium | Water. |
| 58 | Methyl | Methyl | 2-sulphato-1,4-phenylene | Methyl | Phenyl | do | Toluene. |
| 59 | do | do | 1,4-phenylene | β-Chloroethyl | p-sulphophenyl | do | Do. |
| 60 | do | do | 2-methoxy-1,4-phenylene | Hydrogen | do | do | Water. |
| 61 | do | do | 2-methyl-1,4-phenylene | do | do | Ammonium | Ethanol. |
| 62 | do | 6-tetrahydroquinolinylene | | do | m-Sulphophenyl | Trimethylammonium | Do. |
| 63 | do | do | Methyl | 1,4-phenylene | do | do | Dimethylhydrazinium | Do. |
| 64 | do | do | do | do | do | Trimethylhydroxylammonium | Do. |
| 65 | do | do | do | do | do | N-methylpiperidinium | Do. |
| 66 | Ethyl | Ethyl | 3-hydroxy-1,4-phenylene | do | 3-pyridinyl | Sodium | Do. |
| 67 | do | do | do | do | 2-benzthiazolyl | do | Do. |
| 68 | do | do | 1,4-phenylene | do | 4,8-disulpho-1-naphthyl | Disodium | Water. |
| 69 | Methyl | Methyl | do | do | 1-sulpho-2-naphthyl | Triethanol-ammonium | Water. |
| 70 | Phenyl | do | do | do | 4-sulpho-1-naphthyl | Sodium | Ethanol. |
| 71 | Methyl | do | do | Dimethylamino | p-Sulphophenyl | do | Do. |
| 72 | do | do | 1,4-naphthylene | Hydrogen | do | t-Butylammonium | Water. |
| 73 | do | do | 1,4-phenylene | do | p-Mercaptophenyl | Sodium | Ethanol. |
| 74 | do | do | do | do | 6-sulpho-1-naphthyl | Triethylammonium | Do. |
| 75 | Ethyl | Ethyl | 3-hydroxy-1,4-phenylene | Methoxy | Hydrogen | Sodium | Do. |
| 76 | do | do | do | | Morpholino | do | Do. |
| 77 | do | do | do | Hydrogen | 6,8-disulpho-2-naphthyl | Trisodium | Water. |
| 78 | do | do | do | Hydroxyl | Hydrogen | Sodium | Ethanol. |
| 79 | Methyl | Methyl | 1,4-phenylene | Hydrogen | p-Sulphobenzyl | do | Do. |
| 80 | do | do | do | do | m-Sulphobenzyl | Trimethylammonium | Do. |
| 81 | do | do | do | do | 2,5-disulphophenyl | Disodium | Water. |
| 82 | do | do | do | do | 3,5-disulpho-4-methylphenyl | do | Do. |
| 83 | do | do | do | do | 3-sulpho-6-acenaphthyl | Hydrogen | Acetone. |
| 84 | do | do | do | do | | Sodium | Water. |
| 85 | do | do | do | do | 2-bromo-5-sulphophenyl | Potassium | Do. |
| 86 | do | do | do | do | 2,4,6-tribromo-5-sulphophenyl | Sodium | Do. |
| 87 | do | do | do | do | 4-acetylamino-3-sulphophenyl | do | Do. |
| 88 | do | do | do | do | 2-methyl-5-sulphinophenyl | do | Ethanol. |
| 89 | do | do | do | do | p-Thiosulphophenyl | do | Do. |
| 90 | do | do | do | do | 4-Sulpho-n-butyl | do | Do. |
| 91 | do | do | do | do | Phenyl-p-phosphonous acid | do | Do. |
| 92 | do | do | do | do | x-Phosphonoethyl | Disodium | Do. |
| 93 | do | do | do | do | 4-hydroxy-3-sulphophenyl | do | Do. |
| 94 | do | do | do | Cyclohexyl | p-Hydroxyphenyl | Potassium | Toluene. |
| 95 | do | do | do | Benzyl | do | do | Do. |
| 96 | do | do | do | 4-methoxybenzyl | do | Sodium | Do. |
| 97 | do | do | do | Hydrogen | 4-methyl-3-sulphophenyl | Ethylamine | Water. |
| 98 | do | do | do | do | do | Tetramethyl ammonium | Do. |
| 99 | do | do | do | do | p-Sulphophenyl | do | Do. |
| 100 | do | do | do | do | do | Ethyl trimethyl ammonium | Do. |
| 101 | do | do | do | do | p-Sulphinophenyl | Sodium | Ethanol. |
| 102 | Ethyl | Ethyl | 3-hydroxy-1,4-phenylene | do | p-Thiosulphatophenyl | do | Do. |
| 103 | Morpholino | Morpholino | 1,4-phenylene | do | p-Sulphophenyl | do | Do. |
| 104 | Methyl | Methyl | do | do | 3-sulpho-m-propyl | do | Do. |
| 105 | do | do | do | do | 2-methyl-4-sulpho-n-propyl | do | Do. |
| 106 | do | do | do | do | 2-chloro-4-sulpho-n-propyl | do | Do. |

We claim:
1. A leucauramine derivative of the formula:

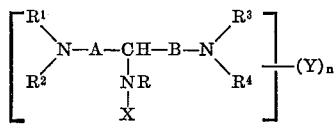

wherein A and B each independently represents an optionally substituted 1,4-arylene residue; R represents hydrogen, hydroxyl, alkoxy, amino, lower alkyl, aralkyl or cycloalkyl; X represents hydrogen or lower alkyl, aralkyl or aryl; each of $R^1$, $R^2$, $R^3$ and $R^4$ independently represents hydrogen or lower alkyl, aralkyl, cycloalkyl or aryl radical; Y represents sulpho and $n$ has a value of 1, 2 or 3 or the alkali metal or ammonium salts thereof.

2. A leucauramine derivative as claimed in claim 1 wherein the sulpho group is in the para position and the salt is the sodium salt.

References Cited
UNITED STATES PATENTS 3,389,172   6/1968   Burrows et al. _____ 260—591

DANIEL D. HORWITZ, Primary Examiner

U.S. Cl. X.R.

260—247.1, 247.5, 268 R, 290 R, 293.85, 293.87, 288 R, 326.8, 326.11, 456 A, 457, 502.6, 502.5, 501.1 R, 501.14, 513.7